United States Patent [19]
Cyliax

[11] Patent Number: 5,533,775
[45] Date of Patent: Jul. 9, 1996

[54] RESTRAINING SYSTEM FOR FOLDABLE REAR-SEAT BACK RESTS IN MOTOR VEHICLES

[76] Inventor: Uwe Cyliax, Marktheidenfelder Str. 2, DE-97842 Karbach, Germany

[21] Appl. No.: 295,941

[22] Filed: Aug. 24, 1994

[30] Foreign Application Priority Data

Aug. 26, 1993 [DE] Germany .......................... 43 28 788.3

[51] Int. Cl.$^6$ ................................ B60N 2/20; B60N 2/42
[52] U.S. Cl. .................. 296/68.1; 296/65.1; 297/216.13
[58] Field of Search .......................... 296/63, 65.1, 68.1; 280/807, 748; 297/216.12–216.14

[56] References Cited

U.S. PATENT DOCUMENTS

| | | | |
|---|---|---|---|
| 3,365,231 | 1/1968 | Burtt | 265/65.1 |
| 3,988,028 | 10/1976 | Satzinger | 280/807 X |
| 5,401,072 | 3/1995 | Farrano | 296/68.1 |

FOREIGN PATENT DOCUMENTS

| | | | |
|---|---|---|---|
| 532378 | 3/1993 | European Pat. Off. | 280/807 |
| 2516113 | 10/1976 | Germany | 296/216.12 |
| 3931696 | 4/1991 | Germany | 280/807 |
| 62-255255 | 11/1987 | Japan | 296/69 |
| 4169360 | 6/1992 | Japan | 280/807 |

*Primary Examiner*—Dennis H. Pedder
*Attorney, Agent, or Firm*—Frank H. Foster; Kremblas, Foster & Millard

[57] ABSTRACT

A restraining system for a foldable rear-seat back rest in motor vehicles including a flexible belt extending from the rear of the seat back and removably attaching to the rear door of the vehicle. The belt is tensioned by an automatic roll-up mechanism which is preferably secured below the rear-seat back rest and mounted to the vehicle chassis. The belt preferably extends from the automatic roll-up mechanism, upwardly through a channel in the rear-seat back rest, and extends out of the upper region of the back rest and removably attaches to the inside of the rear door.

23 Claims, 4 Drawing Sheets

5,533,775

RESTRAINING SYSTEM FOR FOLDABLE REAR-SEAT BACK RESTS IN MOTOR VEHICLES

The invention relates to a restraining system for foldable rear-seat back rests in motor vehicles, in particular passenger cars.

In the event of a head-on collision of a motor vehicle the luggage loaded only loosely is catapulted forward with a multiple of its own weight. Particularly in the case of passenger cars with rear-side luggage compartment the load is flung forward against the rear-seat back rest. In such cases divided rear-seat back rests in particular prove to be highly dangerous, since because of their division they are not very stable and frequently fold over forward under the pressure of the load. In the case of belt-wearing rear passengers this means that the high inertia force of the load, which can be far in excess of a tonne, acts on a rear passenger from behind and presses him into the safety belt or against the front seat. There is therefore a high risk of dangerous internal injuries, in particular ill the upper part of the body.

To date there are known for avoiding this effect only lashing straps and guard nets, with which an uncontrolled movement of the load is prevented. However, guard nets in particular are highly elastic and cannot therefore, like lashing straps, secure the load one hundred per cent. In addition, the loading and unloading is very cumbersome and very time consuming when lashing straps and/or guard nets are used.

These disadvantages of previously known arrangements give rise to the problem underlying the invention, namely the creation of a device with which the rear-seat back rest can be secured against undesirable folding over due to slipping objects.

As a solution to this problem the invention provides a restraining system for foldable rear-seat back rests in motor vehicles, in particular passenger cars, which comprises a detachable, tensionable, tear-proof belt which runs from the upper region of the rear-seat back rest to the vehicle rear and is anchored there. Because the belt runs roughly in the longitudinal direction of the vehicle, a head-on collision is precisely counteracted, so that the rear-seat back rest can no longer be folded forward by objects flung in the direction of travel. Consequently the fixing devices and locking devices of the rear-seat back rest are relieved of stress to a very high degree. The belt runs from the top edge of the rear-seat back rests over the shortest possible route to the vehicle rear, in order to eliminate belt slackness or keep it as low as possible.

It has proved to be suitable that the belt runs within the vertical longitudinal centre plane of the vehicle and/or parallel with the latter. Particularly in the case of undivided rear-seat back rests and those divided asymmetrically about ⅓ to ⅔ the whole path of the belt is drawn through the longitudinal axis of the vehicle, while in the case of rear-seat back rests divided symmetrically ½ to ½ is located next to the longitudinal axis of the vehicle, either on the right-hand or on the left-hand side, the belt guiding being parallel with the longitudinal axis. Preferably a path in the longitudinal axis of the vehicle is aimed at, in order to uniformly deflect the forces occurring.

It comes within the scope of the invention that only one belt is used for a divided rear-seat back rest. Particularly in the case of a rear seat divided ⅓ to ⅔ the forces acting on the wide rear-seat back rest are in general far greater than the forces acting on the other rear-seat back rest. In many cases it is therefore possible to limit the restraining system to the rear-seat back rest particularly under stress.

In order nevertheless to obtain a fully effective restraining system which protects both halves of the back rest, the invention can be developed in that the part of the rear-seat back rest which is not restrained by the belt can be fastened to the restrained part by means of a locking mechanism. By means of such a locking mechanism the smaller back-rest section of a rear-seat back rest divided 1:2 can be connected firmly to the back rest secured by the restraining system according to the invention. The same applies to the unsecured half of a rear-seat back rest divided 1:1.

A useful embodiment of the invention consists in the belt being tensioned by an automatic roll-up device. In this way belt slackness can be completely excluded.

The invention undergoes an advantageous development if the automatic roll-up device is fixed below the rear-seat back rest to the vehicle chassis. In this region on the one hand an extremely short path for the bottom end of the belt is obtained, and on the other the car body bottom is in general capable of absorbing high tensile loads.

It has proved to be suitable that the automatic roll-up device be disposed on a reinforcement member, preferably in the form of a cross-member. Since the car body bottom has to absorb high tensile loads in the region of the automatic roll-up device, it may be necessary to weld in a reinforcing plate and/or an additional cross-member in the car body bottom.

According to a further feature of the invention the automatic roll-up mechanism is disposed outside the passenger compartment and/or outside the luggage compartment. In this way the automatic roll-up mechanism can be attached in such a way that damage due to outside influences can be excluded.

It is also within the scope of the invention that the automatic roll-up mechanism is encapsulated. In vehicles possessing an intermediate bottom as luggage compartment bottom, there is the possibility that the automatic roll-up mechanism can be bolted on free from fouling inside this hollow space between car body bottom and luggage compartment bottom. However, if it is fitted below the car body bottom, encapsulation is necessary in order to exclude fouling.

A suitable development is imparted to the invention by the fact that the belt is guided within the rear-seat back rest from its upper region downward. In this way the belt is on the one hand guided over the shortest route from the upper region of the rear-seat back rest to the automatic roll-up mechanism and is on the other largely protected against damage inside the rear-seat back rest.

There comes within the scope of the invention an arrangement in which the belt is guided inside the rear-seat back rest by a clip U-shaped in profile and positioned roughly vertically. The fact that the belt is laid inside the rear-seat back rest in such a clip enables it to slide freely without becoming Jammed or compressed. This enables the belt roll-up mechanism to tighten the belt continuously in order to prevent slackness of the belt. Moreover a U-shaped profile, that is to say one open on one longitudinal side, has in addition to the advantage of easier fitting of the belt also a relatively low weight with high stability. Steel or extruded aluminium profiles can be selected as material. The latter has an additional weight advantage. The positioning inside the rear-seat back rest enables a smooth-faced rear side of the rear-seat back rest to be maintained, so that there is no gap between load and rear-seat back rest, a fact which is particularly important if larger objects are involved.

A useful development can be obtained if the open longitudinal side of the clip with U-shaped profile points forward. In this way the belt is protected during loading and unloading, and also in the event of a collision, against impact with the load and remains fully functional.

Preferably the clip 3 is fitted in side the rear-seat back rest in front of the base frame 100 shown in FIG. 2. In this way particularly effective functioning of the invention is ensured by preventing the whole of the rear-seat back rest from folding forward. For the high counter-force occurring in the event of a head-on collision can be transferred positively from the base frame of the rear-seat back rest onto the clip located in front of it and from the latter onto the belt.

The invention can be developed by the base frame of the rear-seat back rest exhibiting a lattice structure. In the case of such frame structures known per se a distribution of the restraining force over as wide an area as possible from the belt via the clip onto the whole of the rear-seat back rest is obtained.

It has proved to be suitable that a guide ring through which the belt passes be disposed at the inlet and outlet points respectively of the belt in the rear-seat back rest. These rings serve to prevent slippage or jamming of the belt. They are pushed onto the belt during manufacture of the belt so as to be freely movable, and it is not until the automatic roll-up mechanism and the rear-seat back rest are fitted and/or the belt is laid in the guide clip that they are fixed to the upper and lower ends of the latter.

A moulding of plastics material can in addition be positioned on the top edge of the rear-seat back rest, directly at the belt outlet, in order on the one hand to prevent a belt lock mating piece, if present, from sliding back into the rear-seat back rest and on the other to achieve a reliable and neat covering of the rear-seat back rest opening.

It comes within the scope of the invention that the belt runs above the luggage compartment and/or the luggage compartment cover to the vehicle rear. A direct guiding of the belt above the luggage area cover and/or above the guard net stabilizes and improves the function of the latter.

Particularly in the case of a restraining system for estate cars or hatchbacks it is advantageous that the belt is anchored on the inside of the rear flap. This ensures that on the opening of the rear flap the belt is also held upward and unrestricted freedom of movement during loading and unloading of the vehicle is provided. Even with large loads the belt is rolled away by the automatic roll-up mechanism during the loading operation, so that no additional, manual activity is required. The same applies to unloading, when during the removal of the load and also during the closing of the rear flap the belt is tightened again automatically by the automatic roll-up mechanism.

A suitable development of the invention consists in the fact that the belt is anchored to a cross-member incorporated in the rear flap. This cross-member is subject to tensile and compressive forces when in operation and is intended to absorb the main portion of the impact energy and transfer it to the side structure of the rear region, namely outside the passenger compartment.

The cross-member extends preferably across the whole width of the rear flap. Incorporation of the cross-member in the rear flap has on the one hand the advantage that a rear flap inner panelling with an even surface is retained and consequently no luggage space is lost. On the other hand the whole of the rear flap structure bears the load via the cross-member in the event of a head-on collision and hence the impact energy is also transferred to the rear flap frame.

A further advantageous feature of the invention lies in the fact that the car body-side rear flap frame is supported in the region of the cross-member end points by reinforcement elements running roughly in the longitudinal direction of the car body. There is therefore obtained, in the event of a head-on collision, a definite deflection onto the vehicle chassis of the force introduced by the belt onto the cross-member disposed in the rear flap.

The layout of the reinforcement elements can in addition be optimized by the latter being connected to the rear flap frame on the one hand and to a vehicle side panel and/or a rear mudguard on the other. Such a structure imparts to the reinforcement elements according to the invention a very high, mechanical stability, which is useful not only during the deflection of the belt load, but also in the event of a rear impact, in which the cross-member according to the invention serves in conjunction with the reinforcement elements according to the invention as additional rear impact protection.

Further advantages can be achieved by the rear-side part of the reinforcement elements being formed as a catch element. By means of the catch element the reinforcement elements prevent slippage of the cross-member in the event of an impact and thus provide an extremely high degree of safety. The catch element can possess for example the form of an indent or a kink.

It has proved to be suitable that the rear-side belt end is detachably connected to the vehicle rear, in particular to the rear flap. This feature is necessary when it is desired to enlarge the luggage compartment, to enable the rear-seat back rests to be folded down forward without the belt getting in the way. If the belt is slackened, it is rolled up by the automatic roll-up mechanism until the belt lock mating piece is located in the region of the upper ring of the rear-seat back rest.

Further advantages are obtained by fixing at the vehicle rear, in particular to a cross-member incorporated in the rear flap, a belt lock with which a belt locking tongue disposed on the rear-side belt end can be engaged. Such locking mechanisms known from safety belts are extremely effective and easy to operate, while at the same time being of extremely simple construction.

It comes within the scope of the invention that the belt lock is pivotable about a horizontal axis running oblique to the direction of travel. This degree of freedom is necessary because the belt lock points roughly horizontally forward when the rear flap is closed, whereas it runs obliquely forward, and downward when the rear flap is open. Due to the movability according to the invention the safety belt is always tensioned and damage to the belt band through buckling or jamming is prevented.

In order to achieve further advantages, the invention provides that an abrasion-proof anti-rubbing protector of plastics material be provided in the region of the belt that makes contact with the inside roof lining of the vehicle and/or with the top edge of the rear flap frame when the rear flap is pivoted upward. When the rear flap is opened, the endless belt is also moved upward in order to permit unimpeded loading and unloading. Increasing of the angle of opening of the rear flap causes the belt to be drawn out, whereby a point of contact with the inside roof lining of the vehicle and/or the edge protection of the top edge of the rear flap frame would be obtained. In order to prevent damage occurring to the contacted parts as a result of frequent rubbing, the invention provides an anti-rubbing protector. The anti-rubbing protector can be positioned to be easily replaceable or be incorporated flush with the plastics cover.

Finally it accords with the teaching of the invention that the belt band corresponds to that of a conventional safety belt. Safety belts have been an integral part of car production for many decades and represent in conjunction with belt tighteners and belt stoppers the most important passenger protection system at the present time. This life-saving protection System can according to the invention be applied to the rear-seat back rest, in order to prevent unintentional folding over of the latter in the event of a head-on collision. Conversion into production can take place without difficulty. In addition only reinforcement elements have to be incorporated in the car body, the current car body member being maintained.

Further features, details and advantages based on the invention arise from the following description of some exemplifying embodiments of the invention and from the drawing, where FIG. 1 shows a longitudinal section through the rear region of an estate car in diagrammatic form, FIG. 2 shows detail II from FIG. 1 on an enlarged scale, FIG. 3 shows detail III from FIG. 1 on an enlarged scale, FIG. 4 shows another embodiment of the invention in a view corresponding to FIG. 3.

Figure 1:
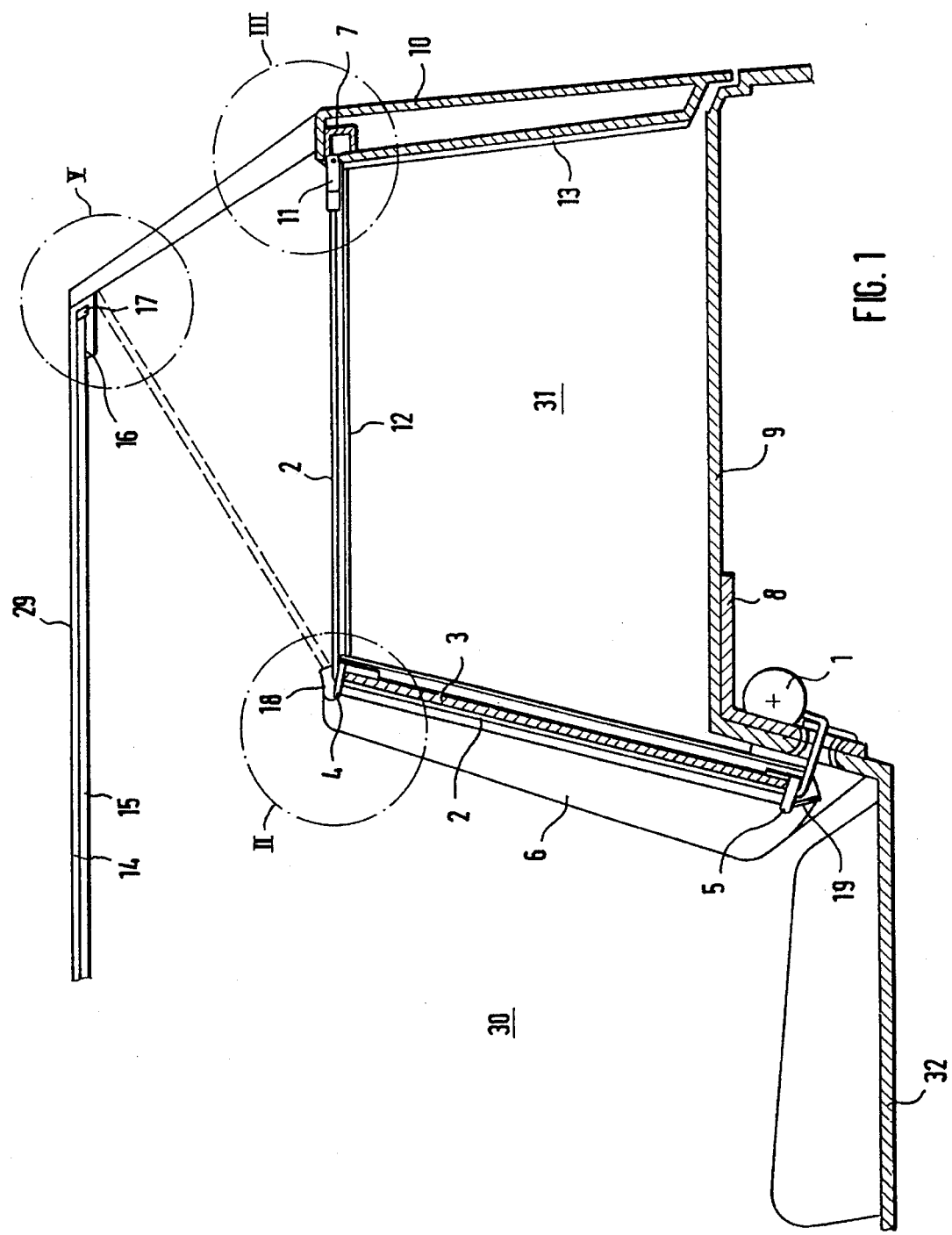
Figure 2:
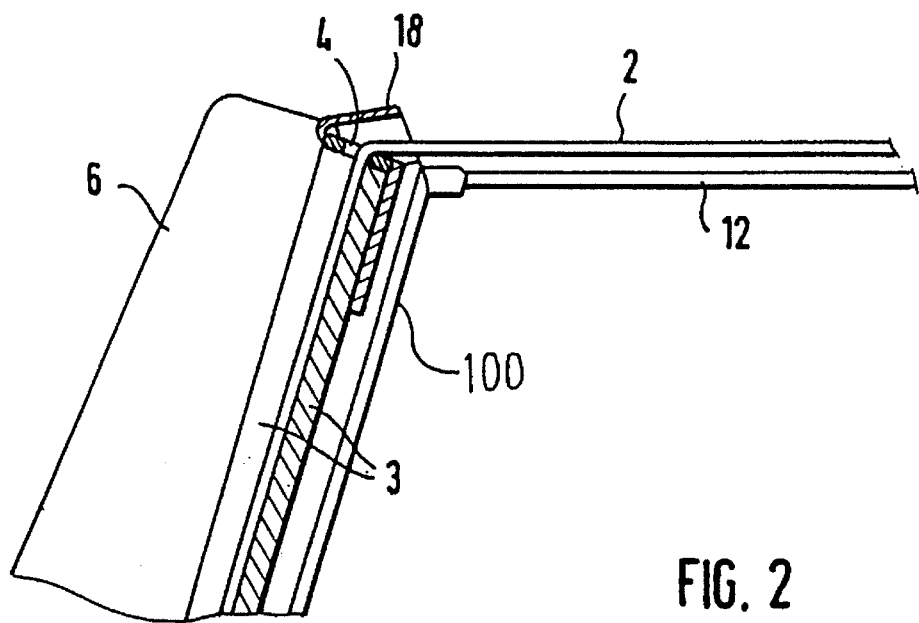

FIG. 1 shows the layout of the rear part of an estate car 29 with its most important components, in order to illustrate the belt guiding according to the invention. From an encapsulated automatic roll-up mechanism 1, which is fitted outside the passenger compartment 30 and outside the luggage compartment 31 on an additional cross-member 8 disposed underneath the car body bottom 32, the belt 2 is passed through an opening in the car body bottom 32 into the passenger compartment 30. The belt 2 is introduced into the rear-seat back rest 6 through a lower cover 19 and a lower ring 5; from there it runs inside the U-profile of a clip 3 and exits through an upper ring 4 and an upper cover 18 out of the rear-seat back rest 6 in the region of its top edge. The belt 2 now extends over the shortest route above the luggage compartment cover 12 to the belt lock 11, which is connected via a cross-member 7 to the rear flap 10. The short path prevents slackness of the belt.

The clip 3 is of very stable construction, because it has to apply the greatest counter-force in the event of a head-on collision. It therefore has to be dimensioned in such a way that it withstands the high stresses of a collision.

Figure 3:
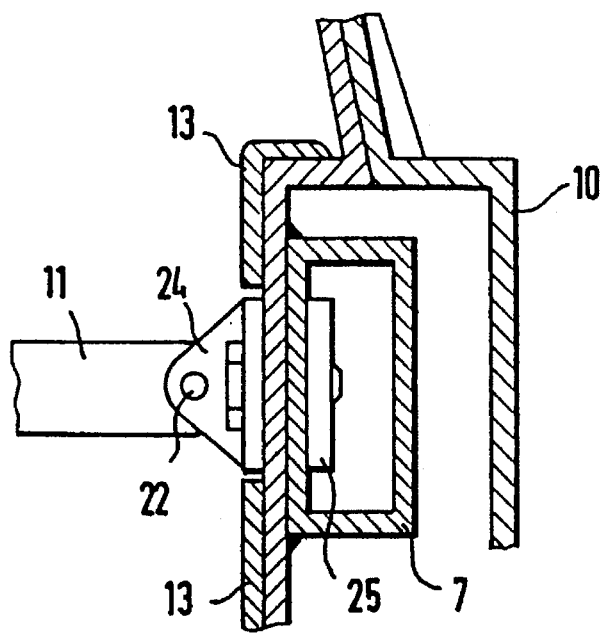
Figure 4:
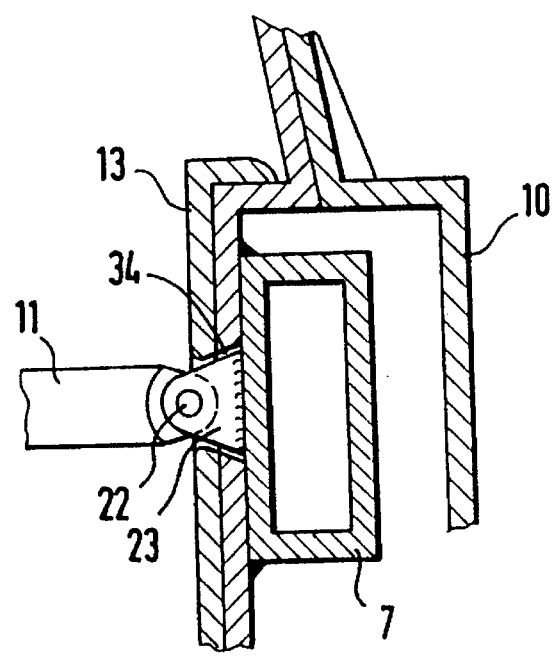

FIGS. 3 and 4 show two different embodiments for the securing of the belt lock 11 to the cross-member 7 in the rear flap 10. It can be seen that the cross-member 7 is welded into the rear flap 10 in such a way that it runs in a horizontal plane over the whole width of the rear flap 10. Incorporation of the cross-member 7 into the rear flap 10 has the advantage that a rear flap inner panelling 13 with an even surface is retained and hence no luggage space is lost. The second and actually more important advantage is that in the event of a head-on collision the cross-member 7 and the whole of the rear flap structure bear the load. The impact energy is therefore also transferred onto the rear flap frame 21.

In FIG. 3 a fixing device 24 for the belt lock 11 is bolted onto a threaded plate 25 located in the cross-member 7. The belt lock 11 is linked to the fixing device 24 so that it can pivot through a horizontal axis of rotation 22 running transversely to the direction of travel. By virtue of the threaded plate 25 able to be bolted on this embodiment has the advantage of ease of final assembly.

FIG. 4 shows a second embodiment. Two loop traction rings 23 are welded onto the cross-member 7 through an opening 34 in the rear flap 10 and produce together with the correspondingly cut out rear flap inner panelling 13 an almost level surface. This embodiment offers several advantages. In the first place damage to luggage is prevented by the almost even surface provided. In the second place there is less weight on account of the fewer components.

Figure 6:
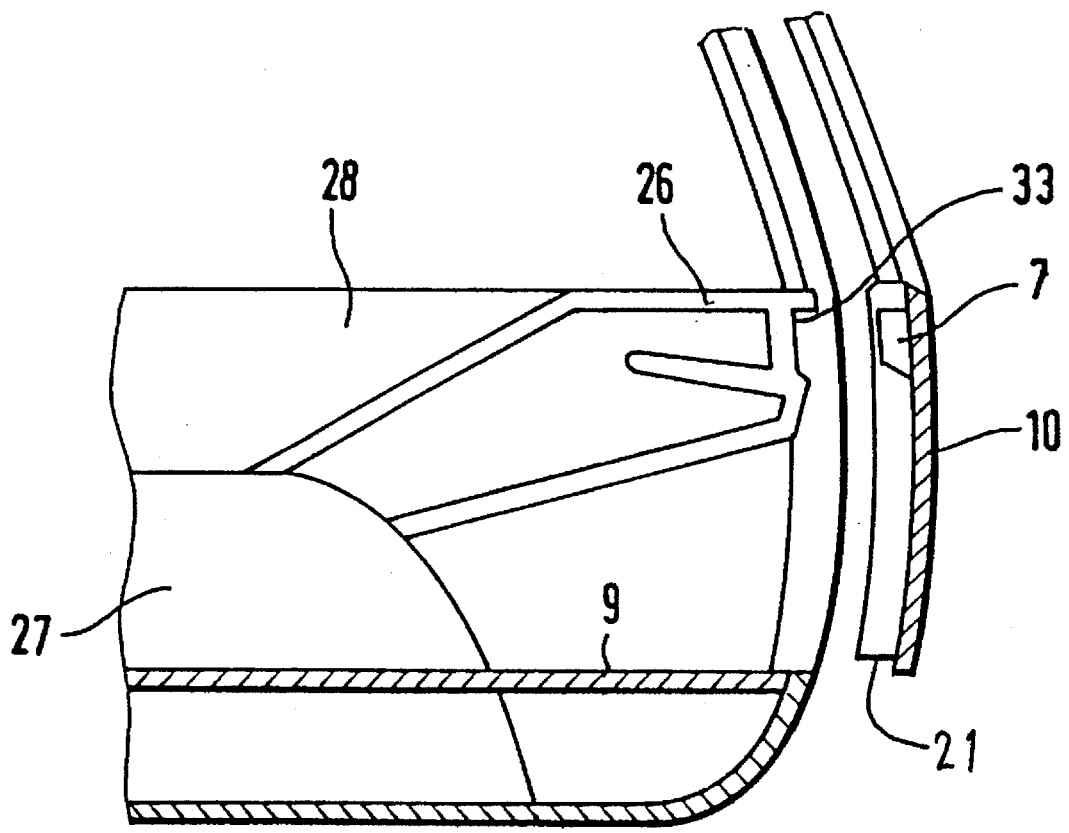
FIG. 6 shows a detailed view of the inside of a rear mudguard with the rear flap slightly open.

In FIG. 6 the rear region of a vehicle is shown diagrammatically, with the reinforcement profile 26, the rear mudguard 27, the side panel 28, the rear flap frame 21 and the luggage compartment bottom 9 in section. It can be seen that the reinforcement profiles 26 exhibit in the rear region an indent 33 or a kink. The reason for this configuration according to the invention is the role of the latter as catch elements, in order to prevent slippage of the overlying cross-member 7 in the event of a collision and to transfer the impact energy in a definite manner through the reinforcement profiles 26 onto the side panels 28 and the mudguards 27.

If a head-on collision comes about, therefore, first of all a belt stopper is activated in the automatic roll-up mechanism 1 and ensures that the belt 2 is held tight. Luggage is flung against the rear-seat back rest 6, which is held in its position by the belt 2. The flow of force now moves in two directions. One part of the impact energy is transferred through the rear-seat back rest 6, the belt 2 and the automatic roll-up mechanism 1 onto the reinforcement plate or through the welded-in cross-member 8 onto the car body bottom 32. The greater part of the impact energy is transferred in the direction of the vehicle rear through the rear-seat back rest 6, the clip 3, the belt 2 and the belt lock 11 onto the cross-member 7 in the rear flap 10 and from there is deflected onto the rear flap frame 21 and onto the reinforcement elements 26, which are welded to the rear flap frame 21, the rear mudguard 27 and the rear side panels 28. It can be seen clearly, therefore, that the absorption of the energy of the load flung forward takes place outside the passenger compartment 30.

The functionally determined inclination of the rear-seat back rest 6 to the rear is of advantage. A catch wedge for the load and luggage, at least with a focal point below the back rest top edge 18, is thus obtained.

Use according to the invention for non-divided rear-seat back rests 6 presents no problems. A locking mechanism is provided for divided rear-seat back rests 6, in order to connect the rear-seat back rest 6 divided ⅓ firmly to the secured rear-seat back rest divided ⅔. The same applies to rear-seat back rests 6 divided ½ to ½.

The use of the cross-member 7 in the rear flap 10 and the supporting on the reinforcement profiles 26 leads to a substantial improvement in safety in the event of a rear impact, particularly in the case of localized contact with the rear flap in an accident. An additional advantage is the reinforcing of the car body structure against oblique collisions from the rear.

FIG. 1 shows by means of a dashed line the path of the belt 2 when the rear flap 10 is open. The amount of space which is required for unimpeded handling is clearly discernible. The unrestricted freedom of movement during loading and unloading of the vehicle 29 is obtained above all by means of the belt 2 drawn upward and constitutes by virtue of the great ease of operation a major advantage of the restraining system according to the invention. Even with a large load, the belt 2 is rolled up by the automatic roll-up mechanism 1 during the loading procedure, so that no additional manual activity is necessary. Moreover during unloading the belt 2 is automatically tightened again by the automatic roll-up mechanism 1 when the load is being removed. The belt is also automatically tightened during the closing of the rear flap 10, so that all the loading procedures can take place in the usual manner.

Figure 5:
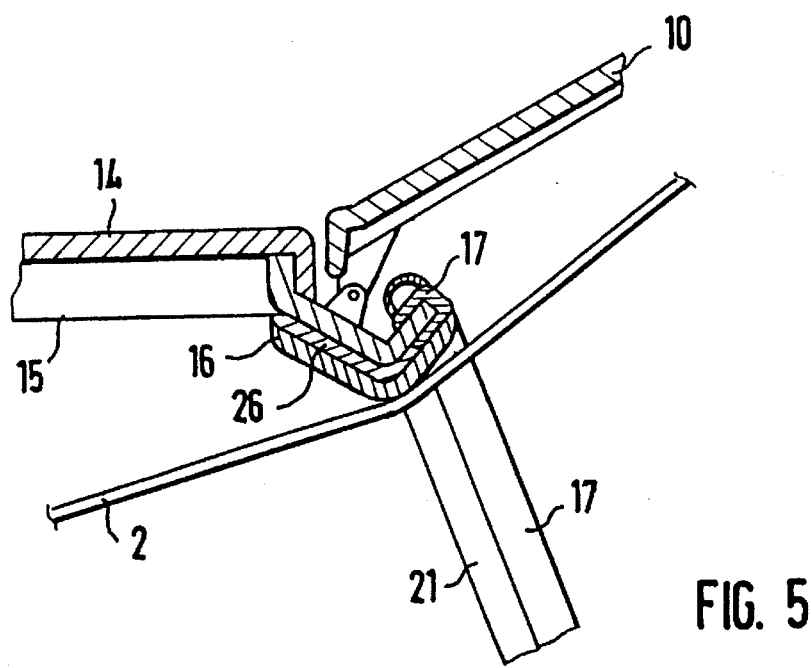
FIG. 5 shows detail V from FIG. 1 with the rear flap open.

FIG. 5 shows diagrammatically the upper rear region Of an estate car or hatchback 29 with roof cover 14, inside roof lining 15, rear flap 10, rear flap frame 21, edge protection with rubber seal 17 and the belt 2. It can be clearly seen here that the belt lies against an anti-rubbing protector 16. On the opening of the rear flap 10 the gap between belt outlet at the rear-seat back rest top edge 18 and the belt lock 11 on the rear flap 10 also increases with the angle of opening. As a result of this movement the safety belt 2 is rolled up by the automatic roll-up mechanism 1 and slides of necessity along the top edge of the rear flap frame 21. In order to prevent damage to the belt 2 and to the relevant components such as inside roof lining 15, edge protection 17 and plastics cover 26, the anti-rubbing protector 16 should be positioned to be easily replaceable or be incorporated flush with the plastics cover 26.

I claim:

1. A restraining system for foldable rear-seat back rests in motor vehicles having a vertical longitudinal center plane comprising a belt which runs from the upper region of a rear-seat back rest and removably attaches to the inside of a rear flap with at least one attachment device.

2. A restraining system according to claim 1, wherein the belt runs substantially parallel to the vertical longitudinal center plane of the vehicle.

3. A restraining system according to claim 1 wherein only one belt is used for a divided rear-seat back rest.

4. A restraining system according to claim 3 wherein the belt is tensioned by an automatic roll-up mechanism.

5. A restraining system according to claim 4, wherein the automatic roll-up mechanism is secured below the rear-seat back rest to vehicle underbody structure.

6. A restraining system according to claim 5, wherein the automatic roll-up mechanism is disposed on a reinforcement member.

7. A restraining system according to claim 4 wherein the automatic roll-up mechanism is disposed outside the passenger compartment.

8. A restraining system according to claim 4 wherein the automatic roll-up mechanism is encapsulated.

9. A restraining system according to claim 4 wherein the belt is guided inside the rear-seat back rest from an upper region of the rear-seat back rest downward.

10. A restraining system according to claim 9, wherein the belt is guided inside the rear-seat back rest by a clip U-shaped in profile and positioned approximately vertically.

11. A restraining system according to claim 10, wherein an open longitudinal side of the U-shaped clip points forward.

12. A restraining system according to claim 10 wherein the clip is mounted in front of a base frame inside the rear-seat back rest.

13. A restraining system according to claim 9 wherein a guide ring passed through by the belt is disposed at inlet and outlet points respectively of the belt into the rear-seat back rest.

14. A restraining system according to claim 1 wherein the belt runs above a luggage compartment to the vehicle rear.

15. A restraining system according to claim 1, wherein the belt is anchored to a cross-member incorporated in the rear flap.

16. A restraining system according to claim 15, wherein the cross-member extends across the whole width of the rear flap.

17. A restraining system according to claim 16, wherein a body-side rear flap frame of the motor vehicle is supported in the region of a cross-member end points by reinforcement elements running in a longitudinal direction of the vehicle.

18. A restraining system according to claim 17, wherein the reinforcement elements are connected to the rear flap frame and to at least one of a vehicle side panel and a rear mudguard.

19. A restraining system according to claim 17 wherein a rear-side part of support profiles is shaped as a catch element.

20. A restraining system according to claim 1 wherein a rear-side belt end is detachably connected to the rear flap.

21. A restraining system according to claim 20, wherein there is secured at the vehicle rear, to a cross-member incorporated in the rear flap, a belt lock with which a belt locking tongue arranged on the rear-side belt end can be engaged.

22. A restraining system according to claim 21, wherein the belt lock is pivotable about a horizontal axis running obliquely to the direction of travel.

23. A restraining system according to claim 1 wherein an abrasion-proof anti-rubbing protector of plastics material is fitted to a region of the vehicle at which the belt would contact with one of an inside roof lining of the vehicle and the top edge of a rear flap frame when the rear flap is pivoted upward.

* * * * *